US010479129B2

(12) United States Patent
Whiteman

(10) Patent No.: US 10,479,129 B2
(45) Date of Patent: Nov. 19, 2019

(54) METHODS OF MANUFACTURING SECURITY STRUCTURES FOR SECURITY DOCUMENTS

(71) Applicant: DE LA RUE INTERNATIONAL LIMITED, Basingstoke, Hampshire (GB)

(72) Inventor: Robert Whiteman, Reading (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 16/073,966

(22) PCT Filed: Jan. 30, 2017

(86) PCT No.: PCT/GB2017/050229
§ 371 (c)(1),
(2) Date: Jul. 30, 2018

(87) PCT Pub. No.: WO2017/130005
PCT Pub. Date: Aug. 3, 2017

(65) Prior Publication Data

US 2019/0039403 A1 Feb. 7, 2019

(30) Foreign Application Priority Data

Jan. 29, 2016 (GB) .................................. 1601654.5

(51) Int. Cl.
*B42D 25/40* (2014.01)
*B42D 25/351* (2014.01)
(Continued)

(52) U.S. Cl.
CPC ............ *B42D 25/40* (2014.10); *B42D 25/29* (2014.10); *B42D 25/337* (2014.10);
(Continued)

(58) Field of Classification Search
CPC .... B42D 25/40; B42D 25/351; B42D 25/337; B42D 25/355; B42D 25/29; B42D 25/373
(Continued)

(56) References Cited

U.S. PATENT DOCUMENTS 3,136,402 A 6/1964 Smith
4,652,015 A 3/1987 Crane
(Continued)

FOREIGN PATENT DOCUMENTS

DE 102010028926 A1 11/2011
EP 2458526 A1 * 5/2012 .......... G06F 3/0488
(Continued)

OTHER PUBLICATIONS

Jun. 14, 2017 International Search Report issued in International Patent Application No. PCT/GB2017/050229.
(Continued)

*Primary Examiner* — Justin V Lewis
(74) *Attorney, Agent, or Firm* — Oliff PLC

(57) ABSTRACT

A method of manufacturing a hybrid security structure for a security document, the method comprising the steps of: providing a document substrate; applying to the document substrate, by a first process, a first element comprising a first electrically conductive region of the hybrid security structure; applying to the document substrate, by a second process, a second element comprising a second electrically conductive region of the hybrid security structure, wherein the first process is different from the second process; and electrically coupling the first and second electrically conductive regions of the hybrid security structure for detection by a capacitance sensor.

35 Claims, 5 Drawing Sheets

(51) Int. Cl.

| | |
|---|---|
| ***B42D 25/337*** | (2014.01) |
| ***B42D 25/373*** | (2014.01) |
| ***B42D 25/29*** | (2014.01) |
| ***B42D 25/355*** | (2014.01) |

(52) U.S. Cl.
CPC ......... *B42D 25/351* (2014.10); *B42D 25/355* (2014.10); *B42D 25/373* (2014.10)

(58) Field of Classification Search
USPC .................... 283/67, 70, 72, 83, 94, 98, 901
See application file for complete search history.

(56) References Cited

U.S. PATENT DOCUMENTS

| | | | |
|---|---|---|---|
| 6,435,408 B1 | 8/2002 | Irwin, Jr. et al. | |
| 2005/0150740 A1 | 7/2005 | Finkenzeller et al. | |
| 2011/0068181 A1 | 3/2011 | Simske et al. | |
| 2012/0125993 A1 | 5/2012 | Thiele et al. | |
| 2019/0102035 A1* | 4/2019 | Foerster | G06F 3/0488 |

FOREIGN PATENT DOCUMENTS

| | | | |
|---|---|---|---|
| EP | 2458526 | A1 | 5/2012 |
| EP | 2858468 | A1 | 4/2015 |
| EP | 3002713 | A1 | 4/2016 |
| WO | 2010/043422 | A1 | 4/2010 |
| WO | 2014/006386 | A2 | 1/2014 |
| WO | 2014/165047 | A1 | 10/2014 |

OTHER PUBLICATIONS

Aug. 2, 2016 United Kingdom Search Report issued in Great Britain Patent Application No. GB1601654.5.

* cited by examiner

Basic variant – plain metallised transfer element a b

METHODS OF MANUFACTURING SECURITY STRUCTURES FOR SECURITY DOCUMENTS

FIELD OF THE INVENTION

This invention relates to methods of manufacturing security structures for security documents and to the corresponding products. In particular, the invention relates to methods of manufacturing hybrid security structures for security documents.

BACKGROUND TO THE INVENTION

The use of capacitive techniques provides a convenient and straightforward method of obtaining information from a security document. In particular, information may be obtained from a security document concerning the nature of the document which may include some measure of its authenticity.

The past few years have seen a rapid development in manufacturing security documents which are capable of interacting by capacitive coupling with touchscreens. Touchscreens are common in (but not limited to) smartphones, mobile phones, displays, tablet-PCs, tablet notebooks, graphic tablets, television devices, input devices, PDAs, and/or MP3 devices. These devices are optimised to detect a user's finger or a stylus that is brought into contact with the touchscreen. In general, the term "touchscreen" refers to a physical interface for sensing electrical capacitances or capacitance differences within sub-areas of a defined area. In smartphones for example, touchscreens are capable of detecting the location of contact by a finger or stylus, together with acting as a display device.

Security documents capable of interaction with touchscreens comprise conductive elements applied on a non-conductive substrate.

It is an object of the present invention to overcome the drawbacks associated with security documents known from the prior art and to provide improved features which exhibit novel and surprising effects. An object of the invention is to make more difficult for the counterfeiter to replicate the conductive pattern.

SUMMARY OF THE INVENTION

In accordance with a first aspect of the present invention there is provided a method of manufacturing a hybrid security structure for a security document, the method comprising the steps of:

providing a document substrate;

applying to the document substrate, by a first process, a first element comprising a first electrically conductive region of the hybrid security structure;

applying to the document substrate, by a second process, a second element comprising a second electrically conductive region of the hybrid security structure, wherein the first process is different from the second process; and electrically coupling the first and second electrically conductive regions of the hybrid security structure for detection by a capacitance sensor.

The present inventors have developed a new type of security structure which may be detected using capacitive techniques to authenticate a security document. This security structure is a "hybrid" because it is formed of separate conductive regions applied to the substrate by different processes. The document substrate is usually a non-conductive substrate made of paper or polymer for example. In exemplary embodiments, the first elements may be applied directly to the document substrate, for example by printing or vapour deposition. Alternatively or additionally, the second elements may be applied indirectly to the document substrate via a carrier or a transfer element. It will be appreciated that the first and second processes may be performed in any order.

For example, the second elements may be applied features such as a metallised surface applied stripe or patch or a metallised security thread, adhered to the substrate by a suitable process, whilst the first elements may be conductive ink elements applied to the substrate by a suitable printing process. Alternatively, the first elements may be applied to the substrate by a different printing process to the second elements, such as a different type of printing process (and therefore excluding a repetition of the same process at a later time).

The main advantage of using a hybrid security structure is that it is difficult to fabricate. Whilst the first and second elements may be formed of the same material, the processes by which they are applied to the substrate are different therefore the complexity of manufacturing the document is increased, and the document is less likely to be counterfeited.

As mentioned above, the elements comprising the electrically conductive regions may be applied directly to the document substrate typically via printing or may be applied initially to an additional, carrier substrate and then either incorporated into the secure document as a thread or transferred to the surface of the secure document in the form of a patch or stripe, for example. It will be appreciated that, in any of these scenarios ("direct" or "indirect" application of the electrically conductive regions onto the document substrate) the document substrate may be already coated so that there may be another layer between the document substrate and the electrically conductive region.

In any of these scenarios the conductive material may take the form of a vapour deposited metallic layer. The metallic layer is typically applied by vacuum deposition, most preferably sputtering, resistive boat evaporation, electron beam evaporation, or chemical vapour deposition. If the conductive regions are directly applied to the surface of the secure document then a suitable transfer mechanism such as hot stamping, thermal transfer, or cold foil transfer can be used. In one example the transferred structure comprising the conductive region can be adhered to the document substrate for example using a conductive adhesive. The advantage of using a conductive adhesive is that it enables electrical connections to the other conductive elements or regions present on the substrate. In another alternative, a security thread comprising the conductive regions may be embedded in the substrate, fully or partially. The advantage of embedding the thread is that it is less conspicuous to the user and therefore less subject to forging or abuse.

Any suitable conductive inks appropriate to the chosen printing process may be used to provide a conductive ink region for example using lithography, offset lithography, UV cured lithography, intaglio, letterpress, flexographic printing, gravure printing or screen-printing. Optionally, the inks may be semi-transparent to be less visible to the user and easier to disguise using conventional printed patterns overlapping the conductive ink region (as will be described in more detail below). Semi-transparent inks may include semi-conductive polymers and silver nano-particles for example.

An electrically conductive region may comprise at least two sub-regions spatially separate from each other, for example in the form of "touch elements". Touch elements represent the electrically conductive elements of the structure whose detection is required. One or each of the first element or the second element may comprise touch elements and accordingly the touch elements may be formed by one or each of the first process or the second process. It has been shown that these touch elements are capable of triggering events on the touchscreen in a similar manner to the user's fingers. Preferably the touch elements are decorative elements of similar or identical dimensions, although they can take any geometrical shape or have any decorative aspect. Preferably, the maximum diameter of each one of the touch elements 4 is less than 20 mm, more preferably less than 10 mm, even more preferably between 6 mm and 10 mm, and most preferably 8 mm in diameter.

A sub-region of the electrically conductive regions may be "active" or "inactive". Active sub-regions are the functional elements of the hybrid security structure. The active sub-regions are directly or indirectly connected to and have the same potential in use as the other electrically conductive region of the hybrid structure. The active sub-regions may be connected to each other by a DC or AC connection.

For example, active sub-regions in the form of touch elements may be connected to a metallised stripe, patch or thread by a trace of conductive ink or a thread. It is preferred that all touch elements are electrically linked to each other or that touch elements form a chain wherein only adjacent touch elements are linked to each other. In this case the metallised stripe, patch or thread to which the touch elements are connected has the function of an "earthing" or "coupling" area for setting the electrical potential of the touch elements to that of a human user. Preferably the earthing area is easily accessible for the user to touch and advantageously may have any arbitrary shape.

Inactive sub-regions are additional to any active sub-regions and are not connected to any active sub-region elements, the inactive sub-regions being electrically and galvanically isolated from the active elements, thus having a different potential in use. The advantage of including inactive touch elements for example having the same or a similar appearance to the active touch elements is to disguise the functional active sub-regions, making them less conspicuous and less likely to counterfeit.

Electrically coupling the first and second electrically conductive regions may be achieved by via at least one DC or AC connecting element. Connecting elements may include threads or linear elements in the form of "traces" of conductive inks, amongst others. Preferably the electrically conductive areas have a sheet resistance smaller than 1000 Ohms per square, preferably smaller than 500 Ohms per square, most preferably smaller than 100 Ohms per square to present a further counterfeit deterrent. It will be appreciated that the provision of any connecting elements may occur prior to either, each of the first or second elements being applied to the document substrate, or between the application of the first and second elements, or after the application of each of the first and second elements. This may be achieved by the use of a third process which is different from either the first or second processes. It is particularly advantageous however to provide the connecting elements as part of the second element and applied by the second process. When one or more connecting elements are provided as part of the first element or the second element, using the respective first or second processes, then this may also effect the electrical coupling the first and second electrically conductive regions.

Preferably, a partial pattern representing a graphic artwork or a graphic design is printed in a region adjacent to or at least partially overlapping spatially with at least one of the first and second electrically conductive regions to form an integrated pattern to conceal the regions. The patterns are preferably repeated or regular structures, comprising for example a series of geometrically arranged elements so that the conductive elements are effectively indistinguishable by eye from the graphical elements.

The partial pattern may be a portion of a conventional graphic pattern comprising, for example one or more of line patterns, guilloche patterns, fine filigree line patterns, dot structures, geometric patterns, alphanumeric characters, symbols or other indicia. The partial pattern may be printed by a conventional method including lithography, UV cured lithography, intaglio, letterpress, flexographic printing, gravure printing or screen-printing using one or more of coloured inks, black inks, optically variable inks, fluorescent inks for example.

Advantageously, in addition to having an aesthetic appearance, the integrated pattern disguises the conductive components in the concealed regions so that they are less conspicuous to a user. Where sub-regions of the conductive areas are formed as decorative elements, such as decorative touch elements for example, the sub-regions "blend" into the pattern and thus the user does not recognise their function, but only their aesthetic appearance.

In preferred embodiments at least one element provides an optically variable effect to further increase complexity in manufacturing and thus increase security. Holographic content may be added, for example, to a metallised stripe, patch or thread by conventional methods. It is well known to provide security documents such as banknotes with security elements which exhibit optically variable effects which cannot be reproduced by standard means such as photocopying or scanning. Typical examples of such elements include holograms and other diffractive devices, which exhibit different appearances, e.g. diffractive colours and holographic replays, at different viewing angles. Similarly, reflective elements can be configured to display different intensities (i.e. brightnesses) at different viewing angles. Photocopies of such elements will not exhibit the same optically variable effects. The term "optically variable effect" means that the device has an appearance which is different at different viewing angles. For example, the structure may be a hologram or kinegram with any desired replay image, or could be a diffraction grating or series of reflective facets.

In accordance with a second aspect of the invention a hybrid security structure is manufactured using a method according to the first aspect of the invention.

In accordance with a third aspect of the invention, a security document is provided, the security document including a hybrid security structure in accordance with the second aspect of the invention. Examples of security documents include banknotes, fiscal stamps, cheques, postal stamps, certificates of authenticity, articles used for brand protection, bonds, payment vouchers, and the like.

In accordance with a fourth aspect of the invention there is provided a method comprising the steps of:

providing a substrate of a security document;

printing on the substrate a first partial pattern having an electrically conductive region for detection by a capacitance sensor; and printing on the substrate a second partial pattern adjacent to or at least partially overlapping the first pattern to thereby form an integrated pattern and conceal the electrically conductive region.

Accordingly to this fourth aspect of the invention, the electrically conductive region is concealed or disguised in an integrated pattern in order to be less conspicuous to a user. As described above, the substrate is usually a non-conductive substrate made of paper or polymer for example. The electrically conductive region of the first partial pattern may be an element of a hybrid security structure as described above with reference to the first aspect of the invention. The second partial pattern may represent a graphic artwork or a graphic design. In combination, the first and second partial patterns form an integrated pattern, so that they are indistinguishable from each other. For example, the partial patterns may be complementary to each other. The patterns are preferably repeated or regular structures, comprising for example a series of geometrically arranged elements so that the conductive elements are effectively indistinguishable by eye from the graphical elements.

The first partial pattern may thus have dual aspect: a functional aspect of the electrically conductive region and an aesthetic aspect provided for example by decorative touch elements or curved conductive traces. Whilst a user may see at least some of the elements of the first partial pattern, the user does not recognise the functional aspect of the first partial pattern, but only the aesthetical aspect. This has the advantage of further increasing the security of the document since the user does not recognise the function of the conductive pattern, which may be to encode information that can be read by a touchscreen. It is therefore less probable that the conductive pattern and/or the security document becomes the subject of counterfeiting or abuse.

It is preferred that the first and second partial patterns overlap as much as possible or coincide spatially in order to distract attention of a user from the functional elements of the first partial pattern when forming the integrated pattern. Advantageously, the elements of the conductive pattern in a part of the electrically conductive region are visible, but are not recognised by a user as functional elements, and thus the security document is less likely to become the subject of counterfeiting or abuse.

Conveniently, the security documents described above may be read by a security document identification device, such as a touchscreen of a smartphone. WO2014/006386 describes known identification devices and methods of interaction with the security documents which may be employed to identify the security structures described herewith. The term "touchscreen" is used synonymously for any touchscreen bearing device in the context of this application. As an alternative to touchscreens, the capacitance sensor may also take the form of a touchpad or trackpad as commonly found on laptop computers.

In summary, aspects of the present invention teach the manufacturing of a new type of hybrid security structure in a security document which may be detected using capacitive techniques to authenticate a security document, in order to increase security. Furthermore, disguising a functional, electrically conductive region (which may or may not be part of a hybrid security structure) in a conventional printed pattern further increases security and has surprising advantages over the prior art. The invention makes it more difficult for the counterfeiter to replicate a conductive pattern either by forming it from two different processes or by concealing it within a pattern of the security document.

BRIEF DESCRIPTION OF THE DRAWINGS

Some examples of embodiments according to the invention are now described with reference to the accompanying drawings, in which.

DESCRIPTION OF EMBODIMENTS

Aspects of the invention are described below with reference to a number of examples. It is intended that particular features illustrated in respect of one example are generally understood to be applicable to the other examples. Many of the examples discuss bank notes although it is to be understood that many types of security documents, including fiscal stamps, security labels, passports, identity documents (such as driving licenses and ID cards), bonds and so on may be identified using the invention. It will be appreciated that capacitance sensing and other forms of security document sensing may be used in combination to allow a more general application of capacitance detection in numerous security document applications.

Figure 1:
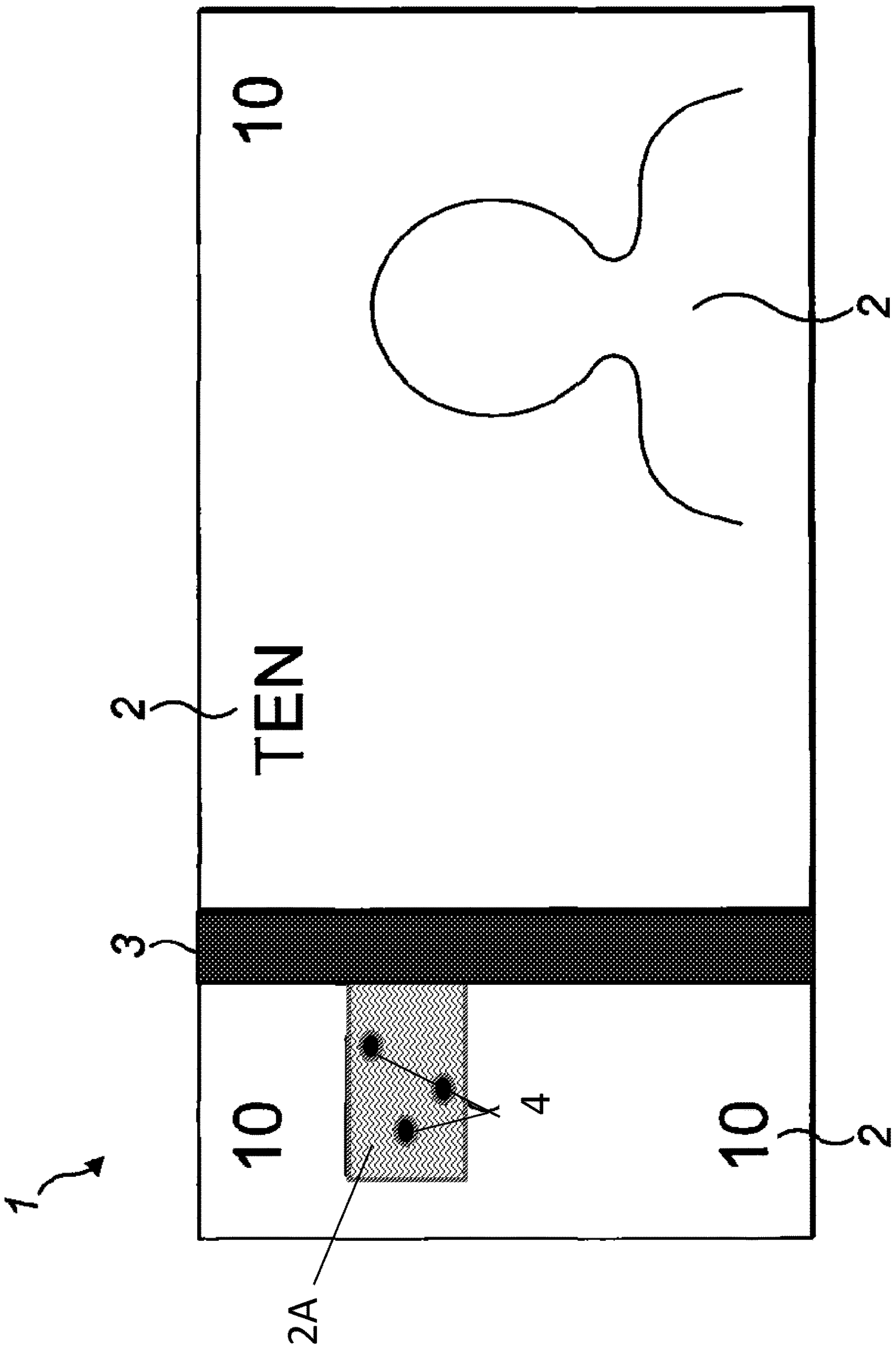
FIG. 1 is a schematic representation of a security document taking the form of a bank note provided with a hybrid security structure according to the invention.

FIG. 1 illustrates an example security document, in this case taking the form of a bank note. The bank note comprises an electrically non-conductive substrate 1, usually paper or polymer, in this case paper.

The bank note contains a number of security features as are known in the art, these including the use of specialist ink compositions including magnetic printing inks, specialised printing techniques including intaglio printing, local variations in the density of the substrate material from which the bank note is constructed, in the form of watermarks, amongst others. Many such features are arranged as indicia which may be visible in the optical or non-optical spectrum (such as infra-red, ultraviolet and so on) and include diffractive responses and/or images.

The conventional features discussed above are generally represented at 2 in FIG. 1. A particular feature also included in this example is a region on the bank note comprising a printed pattern, schematically represented at 2A. The printed pattern may take any suitable form, such as a fine line or guilloche pattern.

A second type of security feature is one which contains electrically conductive material. Such a security feature may be referred to as a conductive element, whereas the conventional security features 2 and 2A discussed above are referred to as non-conductive elements. A conductive element has sufficient size and electrical conductivity so as to sufficiently modify an electric field in the region of the element thereby allowing a measurable capacitive response to be generated by the structure.

In this example, the bank note is provided with an applied conductive element 3 in the form of a stripe comprising a vapour deposited metallic layer. The bank note is further provided with conductive elements 4 of conductive ink, for example containing copper or silver pigments or nanoparticulate inks, printed in the printed area 2A by a suitable known technique.

Figure 2:
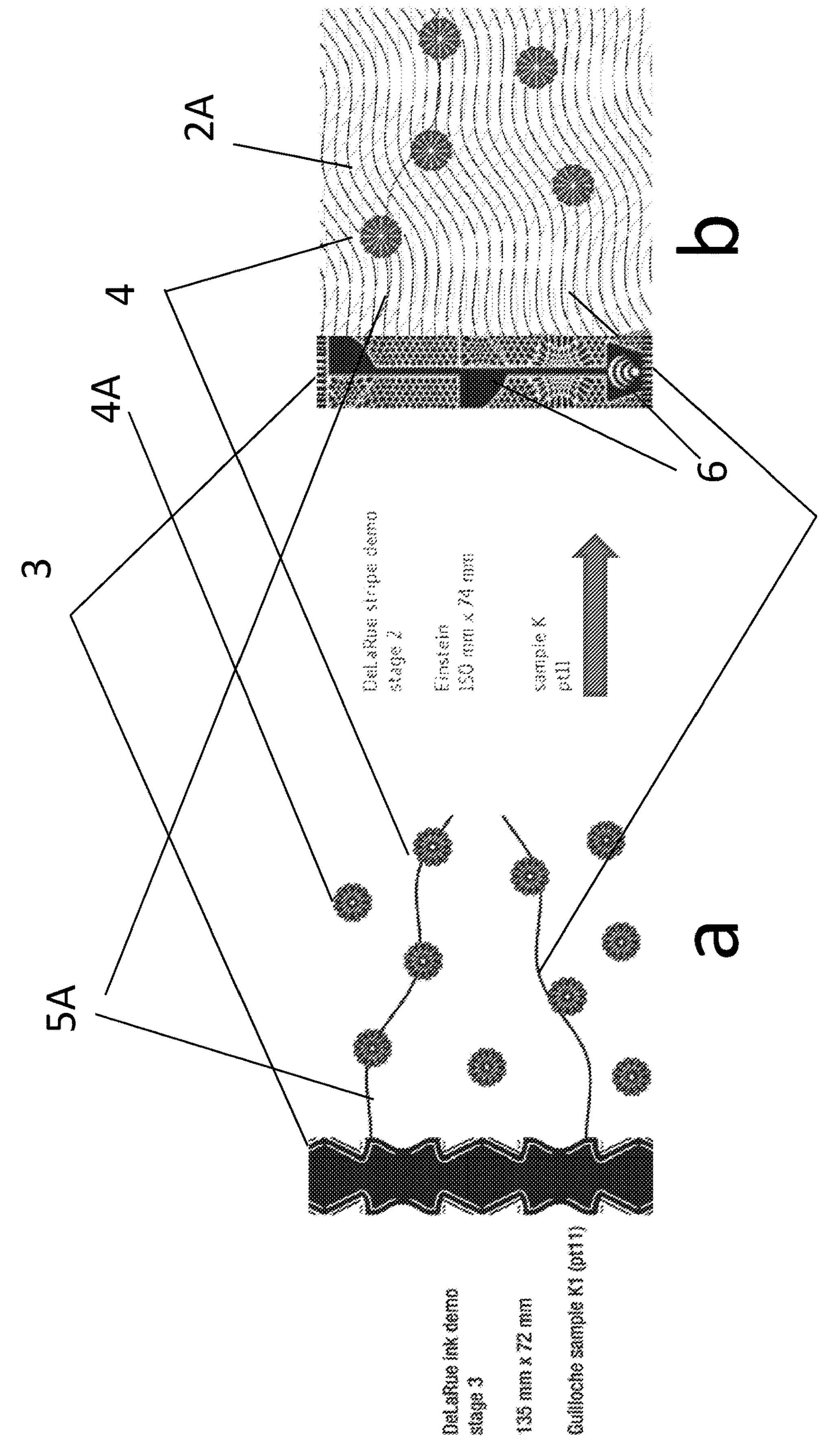
FIGS. 2*a* and 2*b* shows examples of hybrid security structures produced according to aspects of the invention.

Additional conductive elements (not visible in FIG. 1) may be provided on the bank note, including threads which may be at least partially embedded in the substrate, and traces of conductive ink preferably coinciding with the printed pattern 2A, amongst others. Some of these additional conductive elements may form electrical DC or AC connections between other conductive elements and will be described in more detail with reference to FIG. 2 below.

FIG. 2*a* schematically shows the conductive elements of security structure formed in a security document according to the invention. The security structure comprises a stripe 3, which has a patterned vapour deposited metallic layer, applied to the substrate (forming a first electrically conductive region) and a number of conductive elements 4 printed in conductive ink (forming a second electrically conductive region). The touch elements 4 may be printed on the bank note using conductive inks by any suitable methods known in the art.

The combination of at least one or more conductive elements 4, also referred to as "touch elements" in the second electrically conductive region replicates the contact regions produced when fingertips touch a touchscreen surface. Accordingly, the structure can execute an input on a touchscreen in a similar manner to the user's fingers. The arrangement of electrically coupled touch elements may thus be regarded as a "code" which can be read by a touchscreen. The code in this case is a spatial code which we define here as at least the relative two-dimensional arrangement of the touch elements. Preferably such a spatial code also includes the individual geometries of the touch elements. Furthermore the spatial code may also include the relative capacitances of the touch elements with respect to each other, for example due to the use of different electrically conductive materials or the thicknesses of such materials. When the surface of the security document is brought into static and/or dynamic contact with the touchscreen, the touch elements generate local changes in capacitance of the touchscreen.

Preferably the touch elements 4 are decorative elements of similar or identical dimensions. In this example each of the touch elements 4 is in the shape of a stylised flower with 12-fold symmetry. It may be understood, however, that each one of the touch elements 4 can take any geometrical shape or have any decorative aspect, including regular or irregular edges, stars, elliptical areas, clouds, rings and the like. Preferably, the maximum diameter of each one of the touch elements 4 is less than 20 mm, more preferably less than 10 mm, even more preferably between 6 mm and 10 mm, and most preferably 8 mm in diameter.

The security structure shown in FIG. 2A further comprises conductive elements 5A, 5B forming DC electrical connections between a touch element 4 and the foil stripe 3. In this example, touch elements 4 form chains where adjacent touch elements are linked to each other. In this case the vapour deposited metallic layer of the stripe 3 has the function of an "earthing" or "coupling area" for setting the electrical potential of the touch elements 4 to that of a human user.

An electrical connection between the foil stripe 3 and the conductive elements 5A, 5B can be a DC electrical connection or AC inductive coupling. For example, the joint connection may be formed by a conductive adhesive used to adhere the foil stripe to the substrate.

The conductive elements 5A, 5B, also referred to as connecting elements, are preferably narrow and have a generally elongate form. In this example, the connecting elements 5A, 5B are in the form of a curved traces of conductive ink. In other examples, the conductive traces may be straight lines. The line widths of the conductive traces are preferably 0.1-2 mm, more preferably 0.5-1 mm. The conductive inks employed are capable of durably delivering a sheet resistance less than 1000 Ohms per square, ideally less than 500 Ohms per square to present further counterfeit difficulty. Alternatively, a connecting element may be a thread, which may be partially embedded in the document substrate.

Touch elements 4 may be either directly or indirectly connected to the foil stripe 3 via the connecting elements 5A, 5B. In addition to touch elements 4 coupled to the foil stripe 3, directly or indirectly, the structure comprises unconnected touch elements 4A which are not connected to either the stripe 3 nor to the other conductive elements 4, 5A, 5B. In use, unconnected touch elements 4A will not have the same electrical potential as the connected touch elements 4. The unconnected touch elements 4A are referred to as inactive conductive elements, whereas the interconnected elements 3, 4, 5A, 5B, are referred to as active conductive elements. In preferred embodiments, the active touch elements 4 may have the same or a similar appearance to the unconnected touch elements 4A so that they are almost indistinguishable from these.

The foil stripe 3 may be touched in use by a user's finger so that it carries the same potential as the human user and thus represents an "earthing" or "coupling" area. As will be appreciated in alternative embodiments, an active conductive element of the security structure represents a dedicated earthing area, preferably easily accessible for the user to touch. This may be a region printed with a conductive ink and connected to any one of the interconnected active conductive elements. The earthing area may be a closed area or may have an arbitrary shape, comprising a grid of conductive lines or an array of electrically connected structures. The earthing area may also comprise non-conductive spots or parts.

The electrically conductive elements 4, 5A, 5B shown in FIG. 2*a* combine both functional and aesthetic components and may be integrated into a pattern or graphical artwork. FIG. 2*b* shows another example of a security structure having a pattern 2A is printed on the substrate to conceal the touch elements 4 as well as the connecting element 5B. It can be seen that the curved or curvilinear conductive trace 5B is adapted to the aspect of the pattern 2A. In this way, at least a portion of the conductive trace 5B coincides with the pattern 2A and is easier to disguise, making it less likely for the security document to be forged or subject to abuse.

It will be appreciated that the printed pattern 2A can take the form of any graphical artwork and may comprise one or more of line patterns, guilloche patterns, fine filigree line patterns, dot structures, geometric patterns, alphanumeric characters, symbols or other indicia and the like. The patterns can be provided using conventional inks such as coloured inks, white inks, black inks, metallic inks, optically variable inks (such as those incorporating thin film optical interference filters or liquid crystal pigment) and the like. Thermochromic inks, photochromic inks, magnetic inks, infrared absorbing inks and fluorescing and phosphorescing inks may also be employed.

The foil stripe 3 may also be provided with holograms and other diffractive devices, which exhibit different appearances, e.g. diffractive colours and holographic replays, at different viewing angles. Similarly, reflective elements can be configured to display different intensities (i.e. brightnesses) at different viewing angles. Photocopies of such elements will not exhibit the same optically variable effects. The term "optically variable effect" means that the device has an appearance which is different at different viewing angles. In this example the foil stripe 3 is provided with holograms 6 which could represent indicia. Providing holographic content such as registered holographic content is desirable to further increase security. Additional security features such as fine filigree and microtext demet may also be provided on the foil stripe 3.

Figure 3A:
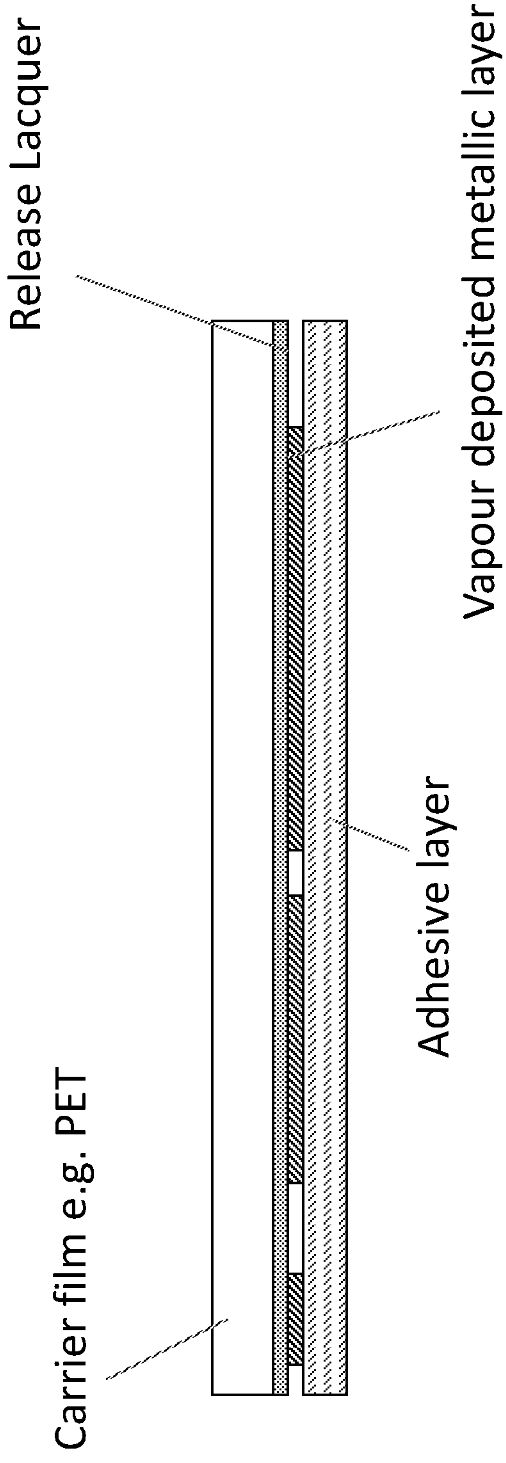
FIGS. 3*a* and 3*b* show examples of transfer element structures.
Figure 3B:
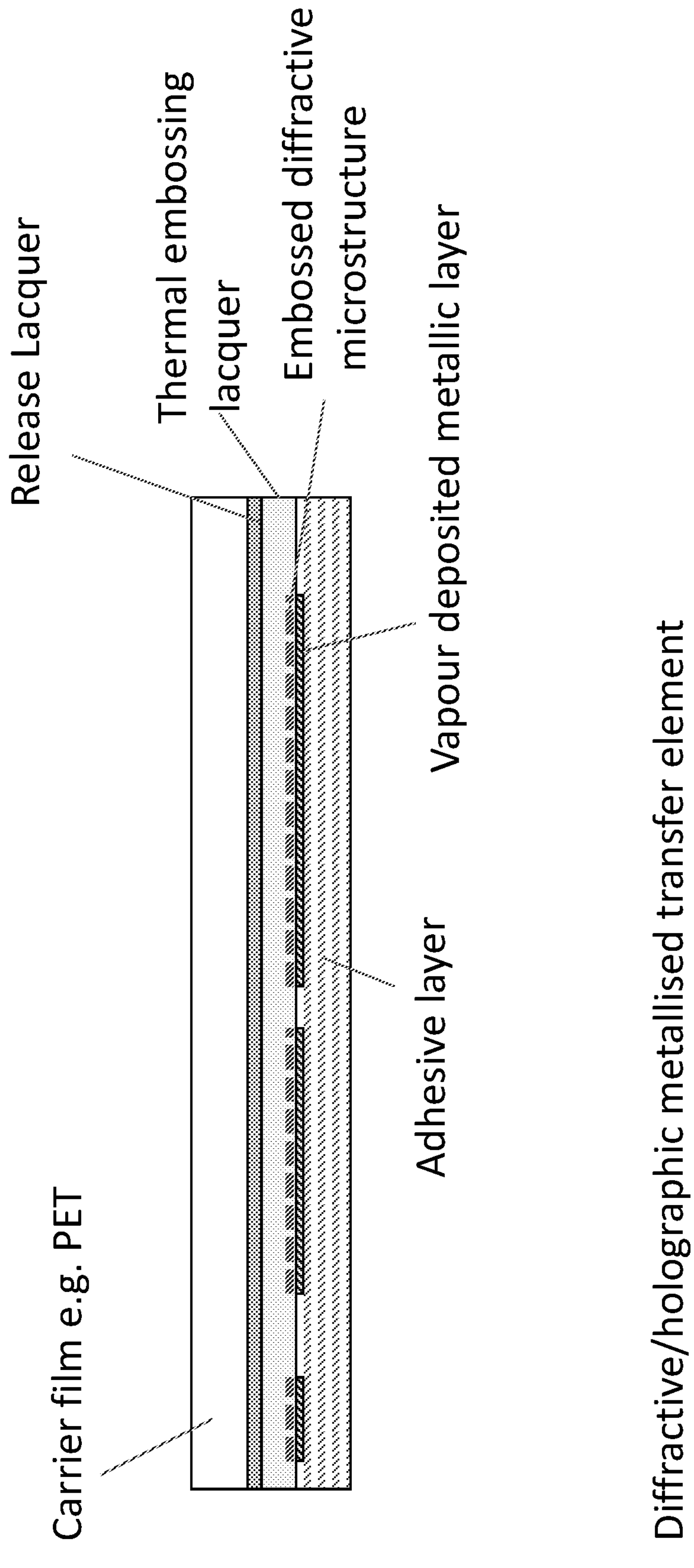

It will be appreciated that the foil stripe 3 may be formed by directly applying the metallised layer to the document substrate using vapour deposition. This would be more typical when the secure document comprised a polymeric base substrate. In particular in the case of paper substrates, more typically, the metallised layer is applied initially to an additional carrier substrate and then transferred to the surface of the secure document in the form of a patch or stripe. In any of these scenarios the conductive material may take the form of a vapour deposited metallic layer. In this case the metallic layer is typically applied by vacuum deposition but it may also be formed by the printing of a conductive ink onto the carrier substrate. In the case of vapour deposition, this is typically sputtering, resistive boat evaporation or electron beam evaporation, or chemical vapour deposition. Typical transfer mechanisms include hot stamping, thermal transfer, or cold foil transfer. In the transfer process, the carrier substrate may remain on the document substrate with the conductive regions or it may be removed during the process. The transferred structure itself may be an active element in itself and thus part of the detectable structure of the security document, when, for example, it is adhered to the substrate by a conductive adhesive. FIGS. 3A and 3B illustrate examples of the structures of known transfer elements.

In alternative embodiments, a thread may be used instead of the foil stripe. A thread may be embedded into a paper substrate to be completely invisible or can be partially embedded (windowed), appearing to weave in and out of the paper when viewed from one side. Conductive features can be built into the thread material using a patterned vapour deposited metallic layer or by printing conductive regions on to the thread. One way to produce patterned partially metallised/demetallised films in which no metal is present in controlled and clearly defined areas, is to selectively demetallise regions using a resist and etch technique such as is described in U.S. Pat. No. 4,652,015. Other techniques for achieving similar effects are for example by vacuum depositing aluminium through a mask, or aluminium can be selectively removed from a composite strip formed from a plastic carrier and aluminium, using an excimer laser.

When the thread is fully embedded, a dedicated earthing region may be provided so that it is easily accessible to be touched by a user. According to the first aspect of the present invention, the process for providing a first element such as a foil stripe 3 (which defines a first electrically conductive region) is different from the process for providing the other interconnected conductive elements (which define a second electrically conductive region) forming the security structure. For example, when a foil stripe is applied to the substrate by a vapour deposition process, the active touch elements are printed onto the substrate using a printing process such as screen printing or any of the examples described below.

Suitable printing processes include lithography, UV cured lithography, offset lithography, intaglio, letterpress, flexographic printing, gravure printing or screen-printing. The elements can be provided using conventional inks such as coloured inks, metallic inks, optically variable inks (such as those incorporating thin film optical interference filters or liquid crystal pigment) and the like. Semi-transparent conductive inks including semi-conductive polymers and silver nano-particles for example may be employed being easier to conceal by a printed pattern than dark or black inks such as black carbon, graphite or graphene derived inks for example.

Any suitable combination of two different processes resulting in a hybrid security structure may be employed. Whilst the processes are different, the electrically conductive regions may be formed of the same or different conductive materials. As explained above, the main advantage of providing such a hybrid security structure is increased difficulty in the structure being counterfeited.

The processes for providing the electrically conductive regions are preferably chosen to maximise mechanical robustness and reduce crumpling of the security document. For example, foil durability may be increased by increasing the thickness of the metal coating. A paper substrate facilitates durability of printed elements using ink, whilst a polymer substrate may provide more robustness when foil stripes are used.

Figure 4:
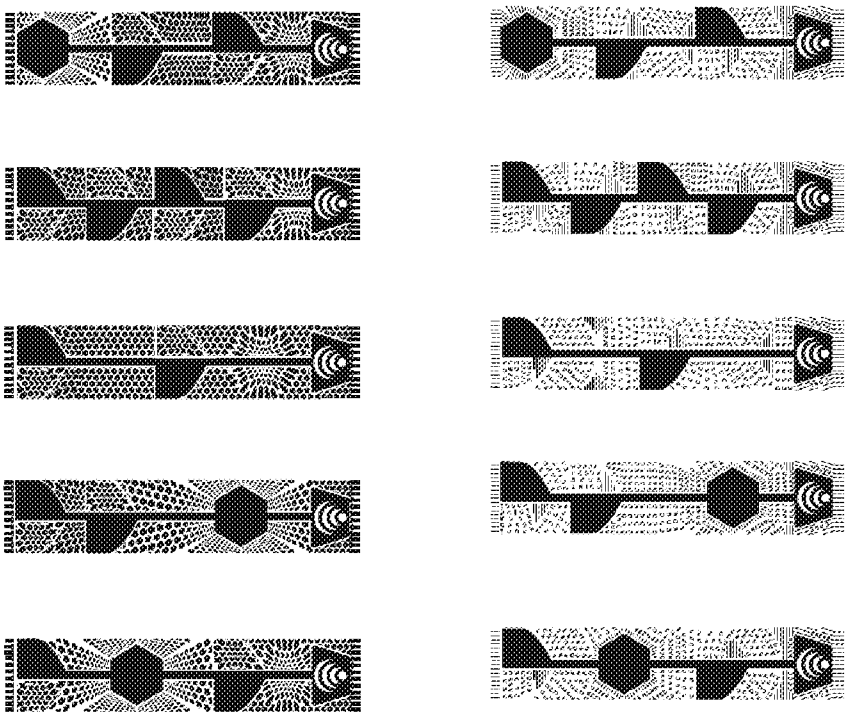
FIGS. 4*a* and 4*b* are schematic representations of methods for obtaining metallic foil stripe designs.

The second elements (such as foil stripes, metallised security threads and so on) may have a number of designs and it is not necessary that they form a solid filled area as shown in FIG. 2*a*. The second elements may also be realised as a pattern having non-conductive portions. FIGS. 4*a* and 4*b* show examples of second element designs which may be employed (in this case as stripes), although it will be appreciated that the invention is not limited to these. A second element may contain any combination of such designs.

Preferably, the foil stripes or other second elements exhibit an aspect similar to other active elements present on the substrate to facilitate integration within the security structure. For example, the second element designs may comprise core elements resembling touch elements and appropriate segmented elements surrounding the core elements. Preferably, the core elements have the same shape and/or dimensions as the touch elements.

The invention claimed is:

1. A method of manufacturing a hybrid security structure for a security document, the method comprising the steps of:

providing a document substrate;

applying to the document substrate, by a first process, a first element comprising a first electrically conductive region of the hybrid security structure;

applying to the document substrate, by a second process, a second element comprising a second electrically conductive region of the hybrid security structure, wherein the first process is different from the second process; and electrically coupling the first and second electrically conductive regions of the hybrid security structure using a DC or AC connecting element, so as to provide an electrical capacitance for detection by a capacitance sensor.

2. A method according to claim 1, wherein the first element is applied directly to the document substrate, and wherein the first process is printing or vapour deposition.

3. A method according to claim 1, wherein the second element is applied indirectly to the document substrate via a carrier substrate or a transfer element.

4. A method according to claim 3, wherein the second process comprises the steps of:

applying metallic material to the carrier substrate to form a metallized stripe, patch or thread; and adhering the metallized stripe, patch or thread to the document substrate.

5. A method according to claim 4, wherein the metallized stripe, patch or thread is adhered to the document substrate using an electrically conductive adhesive.

6. A method according to claim 4, wherein the second process comprises forming a metallized thread and embedding the thread into the substrate, fully or partially.

7. A method according to claim 1, wherein the first electrically conductive region is a region of conductive ink.

8. A method according to claim 7, wherein the first process comprises printing the region of conductive ink on the substrate, by one of lithography, offset lithography, UV cured lithography, intaglio, letterpress, flexographic printing, gravure printing or screen-printing.

9. A method according to claim 1, wherein the second electrically conductive region is a region of conductive ink.

10. A method according to claim 9 wherein the second process comprises printing the region of conductive ink on the substrate, by one of lithography, offset lithography, UV cured lithography, intaglio, letterpress, flexographic printing, gravure printing or screen-printing.

11. A method according to claim 1, wherein the second electrically conductive region comprises at least two sub-regions spatially separate from each other, at least one of the sub-regions being electrically coupled to the first electrically conductive region.

12. A method according to claim 11, wherein the sub-regions are between 6 mm and 10 mm.

13. A method according to claim 1, wherein electrically coupling the first and second electrically conductive regions comprises providing an electrically conductive thread.

14. A method according to claim 1, wherein electrically coupling the first and second electrically conductive regions comprises an elongate or curvilinear element of conductive ink.

15. A method according to claim 14, wherein the elongate or curvilinear element has a width of 0.1-2 mm.

16. A method according to claim 1, wherein the electrically conductive areas have a sheet resistance smaller than 1000 Ohms per square.

17. A method according to claim 1, further comprising the step of printing a partial pattern in a region adjacent to or at least partially overlapping spatially with at least one of the first and second electrically conductive regions to form an integrated pattern with the at least one of the first and second electrically conductive regions thereby concealing the at least one of the electrically conductive regions.

18. A method according to claim 17, wherein the partial pattern comprises one or more of line patterns, guilloche patterns, fine filigree line patterns, dot structures, geometric patterns, alphanumeric characters, symbols or other indicia.

19. A method according to claim 17, wherein the partial pattern is printed on the substrate, by one of lithography, UV cured lithography, intaglio, letterpress, flexographic printing, gravure printing or screen-printing.

20. A method according to claim 17, wherein the partial pattern is provided using one or more of colored inks, black inks, optically variable inks, fluorescent inks.

21. A method according to claim 1, wherein at least one of the first and second elements provides an optically variable effect.

22. A method according to claim 1, wherein at least one of the first and second electrically conductive regions is an earthing area.

23. A method according to claim 1, wherein the capacitance sensor is a touchscreen.

24. A method according to claim 23, wherein the hybrid security structure is detected when the surface of the security document is brought into static and/or dynamic contact with the touchscreen.

25. A hybrid security structure manufactured using a method according to claim 1.

26. A security document comprising a hybrid security structure according to claim 25.

27. A security document according to claim 26, the security document being one from the group comprising banknotes, fiscal stamps, cheques, postal stamps, certificates of authenticity, articles used for brand protection, bonds, payment vouchers.

28. A method according to claim 7, wherein the region of conductive ink is a semi-transparent ink including semi-conductive polymers and silver nano-particles.

29. A method according to claim 9, wherein the region of conductive ink is a semi-transparent ink including semi-conductive polymers and silver nano-particles.

30. A method comprising the steps of:

providing a substrate of a security document;

printing on the substrate a first partial pattern, having an electrically conductive region so as to provide an electrical capacitance for detection by a capacitance sensor; and printing on the substrate a second partial pattern adjacent to or overlapping the first partial pattern to thereby form an integrated pattern and conceal the electrically conductive region, wherein the first partial pattern is printed using conductive ink and wherein the second pattern is printed using a non-conductive ink.

31. A method according to claim 30, wherein the second partial pattern comprises a one or more of line patterns, guilloche patterns, fine filigree line patterns, dot structures, geometric patterns, alphanumeric characters, symbols or other indicia.

32. A method according to claim 30, wherein the partial patterns are printed on the substrate by one of lithography, UV cured lithography, intaglio, letterpress, flexographic printing, gravure printing or screen-printing.

33. A method according to claim 30, wherein the first partial pattern is printed using one or more of semi-transparent inks, colored inks, black inks, optically variable inks.

34. A method according to claim 30, wherein the second partial pattern is printed using one or more of colored inks, black inks, optically variable inks, magnetic inks, fluorescent inks.

35. A method according to claim 30, wherein the security document comprises a hybrid security structure;

wherein the first partial pattern forms a first electrically conductive region of the hybrid security structure;

wherein the second partial pattern forms a second electrically conductive region of the hybrid security structure;

wherein the second partial pattern is printed by a different process from the first partial pattern; and wherein the first and second electrically conductive regions are electrically coupled for detection of the electrical capacitance by the capacitance sensor.

* * * * *